UNITED STATES PATENT OFFICE.

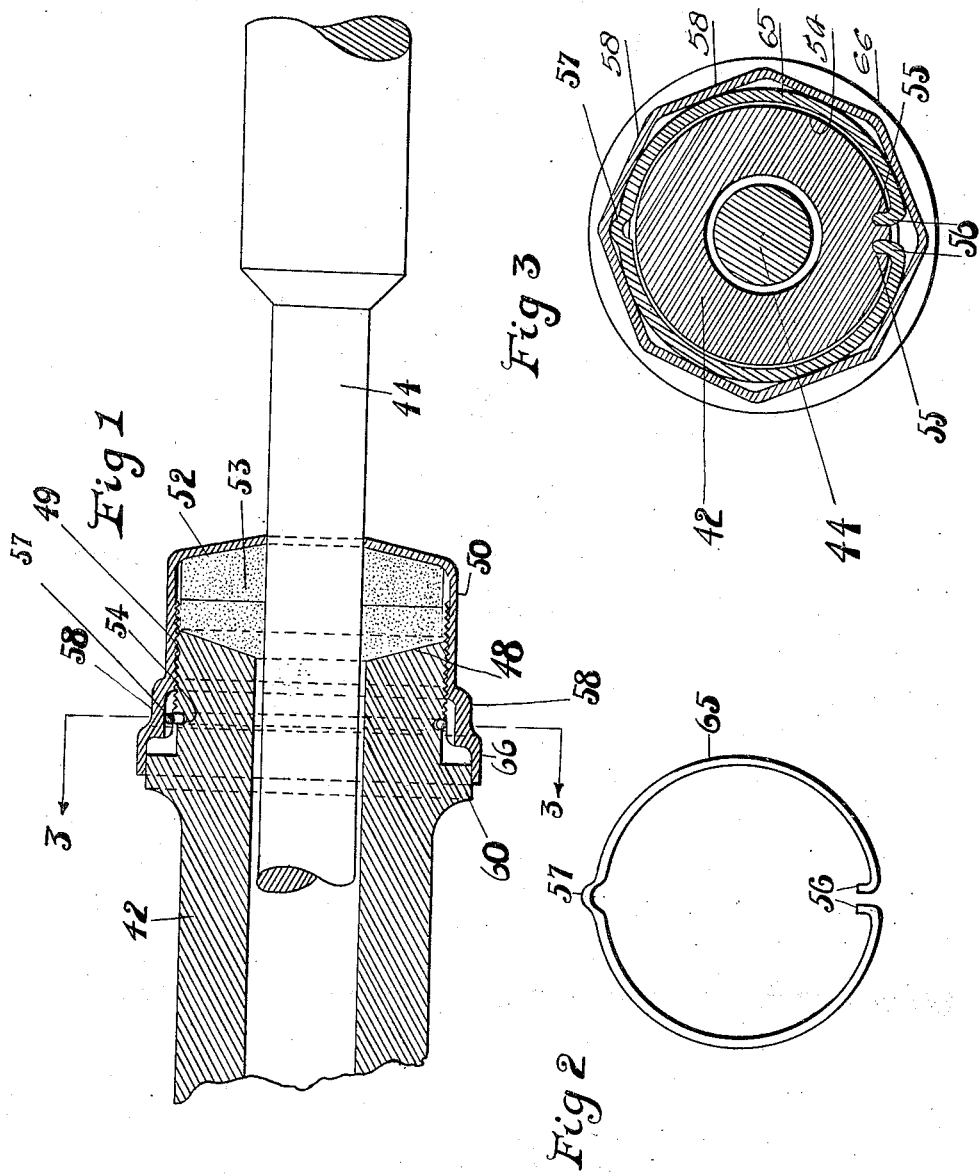

ALFRED B. MORSE, OF SOUTH EASTON, MASSACHUSETTS, ASSIGNOR, BY MESNE ASSIGNMENTS, TO JULIA A. MORSE, OF SOUTH EASTON, MASSACHUSETTS.

LOCKING NUT.

1,427,313.   Specification of Letters Patent.   Patented Aug. 29, 1922.

Original applicaton filed February 24, 1920, Serial No. 360,930. Divided and this application filed May 6, 1921. Serial No. 467,239.

*To all whom it may concern:*

Be it known that I, ALFRED B. MORSE, a citizen of the United States, and resident of South Easton, in the county of Plymouth and State of Massachusetts, have invented an Improvement in Locking Nuts, of which the following description, in connection with the accompanying drawings, is a specification, like letters on the drawing representing like parts.

My present invention is an improved construction of locking nut and is a divisional of my prior application Ser. No. 360,930, filed February 24, 1920. In the present application and the attached drawings I have illustrated my invention as applied to a locking nut arrangement in connection with a universal joint, the said prior application being directed to cover my novel arrangement of universal joint construction wherein the present novel type of locking nut is utilized.

An important feature of the present invention consists in the provision of means on the member to which the nut is applied, as well as on the interior of the nut itself, of cooperating devices adapted to receive, hold and lock the nut in its adjusted position. I prefer to employ a ring, preferably a spring or wirelike member, arranged to encircle a portion of the hub or member to which the nut is applied, having a part, end or ends of the spring member rigidly secured to or anchored in the hub or member and to provide the nut with interior recesses, such for example as the angular portions of an octagonal flange which will successfully register with a portion of the spring ring or member. This arrangement permits the locking of the nut at each successive one-eighth turn, when a predetermined portion of the spring member interlocks with the angular part where the octagonal sides are joined, and affords an instant, ready and fine adjustment of the nut on its threads for the locking engagement. Furthermore, by having the cooperating recessed or octagonal portion of the nut formed as a flange and on a part only of the nut, the threading action can be effected until the nut is practically turned home and then the locking, cooperating portions will engage and continue in engagement until the nut is in desired position.

Furthermore this locking provision is concealed and protected from water, dust, dirt or exterior interference and is also protected from view, thus preventing any accidental disengagement of the locking devices. Furthermore, my construction permits of a ready unlocking and removal of the nut, spring and assembled portions, such removal and unlocking in no way impairing the efficiency of the locking members, but enabling them to be in condition at all times for further locking or subsequent use.

As shown in the attached drawings, the nut locking device and hub are illustrated in connection with the forcing of a packing member arranged around one part of a shaft in my improved universal joint construction, but the locking nut arrangement per se is not so limited, but may be of wide adaptation and use.

Referring to the drawings illustrating a preferred embodiment of the invention,

Fig. 1 is a longitudinal view of the locking nut, partly in cross section, attached to a hub or member;

Fig. 2 is a view of the spring ring; and

Fig. 3 is a cross-sectional view on the line 3—3 of Fig. 1.

As the present application is a divisional of my said prior application I have utilized the same reference characters, so far as possible, in the attached drawing, as appear in my said parent application, but it will be understood that the locking feature is not thus limited.

Referring to the drawings, 42 illustrates a shaft or hub of one member, 44 being a cooperating member adapted to rotate within the member 42 and a liquid tight packing 53 being provided to prevent oil or other lubricant from escaping, in this particular embodiment of the invention the locking nut 50 being adapted to engage, hold and compress the packing material 53 against the conical face 48 on the end of the member 42. The packing nut 50 comprises a suitable shell or portion having its inner diameter threaded to cooperate with the threaded portion 49 of the member 42. In the particular embodiment herein shown I have formed the end or head of the nut 50 with a beveled face 52, substantially on the same bevel or angle as the beveled end face 48 of the member 42, in order to cooperate therewith and compress the packing material 53 against the surface of the shaft 44. This, however, is entirely optional and is only for the specific purpose herein shown of forcing the packing material against the shaft as shown in the drawings.

The member 42 has formed thereon a circumferential groove 54, adapted to receive a packing ring 65, having its ends 56 fitting in adjacent bored recesses 55, 55, in the member 42 and at any desired point throughout the groove 54. The ring 65 has its end parts 56 bent substantially at right angles to fit in the recesses 55, thus holding the ring 65 in non-rotatable engagement with the hub 42, while permitting an expansion and contraction of the rest of the ring 65. Substantially at the point opposite the bent end portions 56 is a kink or curve 57, the entire ring 65 being of slightly greater diameter than that of the groove 54 in which it lies and therefore affording a substantial expansion and contraction of the ring within said groove.

The nut 50 has formed on its lower or open portions an enlarged octagonal or angular flange 58, as clearly shown in Fig. 1. This flange also being spaced sufficiently to cooperate with the spring ring 65 and engage the same as the nut 50 is rotated near its final desired position. The curved part 57 of the ring is also of suitable form and extent to cooperate with the angles made by the octagonal sides of the flange 58 and fits snugly within the recesses afforded by the junction of each of such octagonal sides. Any other number of angular faces, or a series of similar recesses in the flanged portion 58 of the nut can be employed to cooperate with said curve or kink 57, and hold the same after the nut has been rotated sufficiently to engage these parts. The ring 50 springing the curved portion 57 into one of the angles, will serve to effect the locking action and hold the nut against unturning and loosening. In order to protect the locking ring and member against dust, dirt or damage and preserve its spring tension intact, I prefer to entirely enclose that portion of the member 42 containing the same and to this end provide a collar or ringlike part 60 around the member 42 and extend the flange 58 by a further round flange part 66 which will overlap and slide upon the collar 60 as clearly shown in Fig. 1. Thus, as the nut 50 is rotated upon the threaded end portion 49 and member 42 it will be freely turned until the outermost flange 66 slides over the collar 60 and at about this time the octagonal portion 58 will engage the part 57 on the spring ring 65 and effect the locking action, continued rotation of the nut 49 until in desired position maintaining the same at all times in a locking engagement at every eighth turn. The spring 65 cannot be readily displaced because it is fitting within the groove 54, as well as being retained by the ends 56 within the secesses 55.

Removal of the nut 50 can be readily and easily effected without injury to the locking members and when removed the locking devices are uninjured, can be utilized for renewing the locking engagement at any time and will be maintained in condition indefinitely, because of the protecting and concealing covering afforded by the flanges 58 and 66 and collar 60. Any number of faces in place of the octagonal flange 58 as here shown can be substituted or a plurality of recesses adapted to cooperate with the portion 57 of the spring 65 can be employed.

My invention is further described and defined in the form of claims as follows:

1. An improved locking device comprising a rotatable multi-recessed socket, a spring ring stationary with respect thereto and provided with a portion adapted to be engaged by one of said recesses.

2. An improved nut locking device comprising a rotatable multi-sided socket, a spring ring stationary with respect thereto and provided with a projection spring held in the angle defined by adjacent faces of the multi-sided socket.

3. An improved nut locking device comprising a relatively stationary threaded support, a hollow interiorly threaded packing nut engaging the threads on said support and having a plurality of flat faces thereon defining an interior multi-sided socket, a circumferential groove on said support, a spring ring having an outwardly extending projection in said groove and held against rotative movement on the support, said projection being forced into the groove against the resiliency of said ring as the same is engaged by the flat faces of said socket in the rotation of the packing nut, and being forced into the angle defined by adjacent faces of said socket to lock the packing nut in any desired position against rotation.

4. An improved nut locking device comprising a rotatable multi-recessed socket, a spring ring stationary with respect thereto and provided with a portion adapted to be engaged by one of said recesses, said spring being held in an enclosing protecting recess.

In testimony whereof, I have signed my name to this specification.

ALFRED B. MORSE.